United States Patent
Wang et al.

(10) Patent No.: US 11,804,032 B2
(45) Date of Patent: Oct. 31, 2023

(54) METHOD AND SYSTEM FOR FACE DETECTION

(71) Applicant: ZHEJIANG DAHUA TECHNOLOGY CO., LTD., Zhejiang (CN)

(72) Inventors: Bin Wang, Hangzhou (CN); Gang Wang, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 308 days.

(21) Appl. No.: 16/874,540

(22) Filed: May 14, 2020

(65) Prior Publication Data

US 2020/0272808 A1 Aug. 27, 2020

Related U.S. Application Data

(63) Continuation of application No. PCT/CN2017/115293, filed on Dec. 8, 2017.

(30) Foreign Application Priority Data

Nov. 14, 2017 (CN) .......................... 201711122961.X

(51) Int. Cl.
- *G06V 10/774* (2022.01)
- *G06V 40/16* (2022.01)
- *G06F 18/24* (2023.01)
- *G06F 18/214* (2023.01)

(52) U.S. Cl.
CPC ...... *G06V 10/7747* (2022.01); *G06F 18/2148* (2023.01); *G06F 18/24* (2023.01); *G06V 40/165* (2022.01); *G06V 40/172* (2022.01)

(58) Field of Classification Search
CPC .. G06V 40/165; G06V 40/172; G06V 40/161; G06K 9/6257; G06K 9/6267
See application file for complete search history.

(56) References Cited

U.S. PATENT DOCUMENTS

| | | | |
|---|---|---|---|
| 7,515,739 B2 * | 4/2009 | Porter | G06V 40/161 |
| | | | 348/207.99 |
| 2003/0110147 A1 | 6/2003 | Li et al. | |
| 2004/0066966 A1 | 4/2004 | Schneiderman | |

(Continued)

FOREIGN PATENT DOCUMENTS

| CN | 101196995 | 6/2008 |
|---|---|---|
| CN | 102129572 | 7/2011 |

(Continued)

OTHER PUBLICATIONS

International Search Report in PCT/CN2017/115293 dated Aug. 17, 2018, 4 pages.

(Continued)

*Primary Examiner* — Wesley J Tucker
(74) *Attorney, Agent, or Firm* — METIS IP LLC

(57) ABSTRACT

A method for identifying one or more faces in an image may include determining a detection region in an image based on at least one of a plurality of detection scales, and identifying one or more faces in the detection region based on the at least one of the plurality of detection scales. The method may further include calibrating the detection region based on one or more identified faces.

16 Claims, 9 Drawing Sheets

(56) References Cited

U.S. PATENT DOCUMENTS

| | | |
|---|---|---|
| 2004/0179719 A1 | 9/2004 | Chen et al. |
| 2006/0177110 A1* | 8/2006 | Imagawa ............. G06V 40/161 |
| | | 382/118 |
| 2007/0172099 A1* | 7/2007 | Park .................... G06F 18/2132 |
| | | 382/218 |
| 2008/0158407 A1* | 7/2008 | Funamoto ............ H04N 23/675 |
| | | 348/E5.045 |
| 2008/0273097 A1* | 11/2008 | Nagashima .......... G06V 10/255 |
| | | 382/118 |
| 2009/0018980 A1* | 1/2009 | Zhang .................. G06V 40/172 |
| | | 706/12 |
| 2009/0207266 A1* | 8/2009 | Yoda .................... H04N 9/8205 |
| | | 348/222.1 |
| 2009/0231627 A1* | 9/2009 | Matsuhira ............ G06V 40/161 |
| | | 358/1.18 |
| 2010/0141787 A1* | 6/2010 | Bigioi .................. G06V 40/161 |
| | | 348/222.1 |
| 2013/0329955 A1 | 12/2013 | Steinberg et al. |
| 2014/0270490 A1* | 9/2014 | Wus .................... G06V 40/162 |
| | | 382/165 |
| 2016/0078323 A1* | 3/2016 | Ml ....................... G06K 9/6282 |
| | | 382/103 |
| 2017/0004369 A1* | 1/2017 | Kim ..................... G06V 40/172 |

FOREIGN PATENT DOCUMENTS

| | | |
|---|---|---|
| CN | 102799901 | 11/2012 |
| CN | 104036284 | 9/2014 |
| CN | 104112131 | 10/2014 |
| CN | 105404901 | 3/2016 |
| CN | 106156808 | 11/2016 |
| CN | 106557750 | 4/2017 |

OTHER PUBLICATIONS

Written Opinion in PCT/CN2017/115293 dated Aug. 17, 2018, 4 pages.
First Office Action in Chinese Application No. 201711122961.X dated Oct. 28, 2019, 16 pages.
The Extended European Search Report in European Application No. 17931962.9 dated Nov. 11, 2020, 8 pages.

* cited by examiner

METHOD AND SYSTEM FOR FACE DETECTION

CROSS-REFERENCE TO RELATED APPLICATIONS

This application is a continuation of International Application No. PCT/CN2017/115293 filed on Dec. 8, 2017, which claims priority of Chinese Patent Application No. 201711122961.X filed on Nov. 14, 2017, the contents of each of which are incorporated herein by reference.

TECHNICAL FIELD

The present disclosure relates to the field of face recognition technology, more specifically, relates to a method and system for face detection.

BACKGROUND

Face detection is a very important research direction in the field of artificial intelligence. Most of the intelligent analysis, such as face recognition, emotion recognition, face attribute, etc., are dependent on face detection.

Face detection algorithm may normally include, for example, cascade structure, Deformable Parts Model (DPM), deep learning. DPM and deep learning are very complex and may depend on powerful computing capacity and large training samples. Cascade structure may be commonly used in present engineering practice. However, the training convergence of the cascade structure may be slow and traditional Classification and Regression Tree (CART) method couldn't get the relationship between different feature dimensions and ignore the characteristics of the high-order information.

Accordingly, new mechanisms for face detection are desirable.

SUMMARY

The present disclosure provided herein relates to methods and systems for face detection. According to one aspect of the present disclosure, a method for face detection is provided. The method may be implemented on a computing device having at least one processor, at least one computer-readable storage medium, and a communication port. The method may include one or more of the following operations: obtaining an image; determining a plurality of detection scales; determining a detection region in the image based on at least one of the plurality of detection scales; and identifying one or more faces in the detection region based on the at least one of the plurality of detection scales.

According to another aspect of the present disclosure, a method for face detection is provided. The method may be implemented on a computing device having at least one processor, at least one computer-readable storage medium, and a communication port. The method may include one or more of the following operations: obtaining an image; determining one or more faces in the image by a plurality of classifiers at a first stage; if one or more faces are identified in the image at the first stage, determining a positive image; if no face is identified in the image at the first stage, determining a negative image, and modifying at least one of the plurality of classifiers at the first stage based on the negative image.

According to another aspect of the present disclosure, a system for face detection is provided. The system may include an input/output module configured to receive an image. The system may further include an initialization unit configured to determine a plurality of detection scales. The initialization unit may also determine a detection region in the image based on at least one of the plurality of detection scales. The system may further include a classification unit configured to identify one or more faces in the detection region based on the at least one of the plurality of detection scales.

According to another aspect of the present disclosure, a system for face detection is provided. The system may include an input/output module configured to obtain an image. The system may further include a classification unit configured to determine one or more faces in the image by a plurality of classifiers. The classification unit may determine a positive image if one or more faces are identified in the image, and determine a negative image if no face is identified in the image. The system may further include a training unit configured to modify at least one of the plurality of classifiers based on the negative image.

According to another aspect of the present disclosure, a non-transitory computer readable medium embodying a computer program product is provided. The computer program product comprising instructions that are configured to cause a computing device to determine a plurality of detection scales and determine a detection region in the image based on at least one of the plurality of detection scales. The computer program product includes instructions further configured to cause the computing device to identify one or more faces in the detection region based on the at least one of the plurality of detection scales.

According to another aspect of the present disclosure, a non-transitory computer readable medium embodying a computer program product is provided. The computer program product comprising instructions that are configured to cause a computing device to obtain an image and determine one or more faces in the image by a plurality of classifiers at a first stage. The computer program product includes instructions further configured to cause the computing device to determine a positive image if one or more faces are identified in the image at the first stage, and determine a negative image if no face is identified in the image at the first stage. The computer program product also includes instructions configured to cause the computing device to modify at least one of the plurality of classifiers at the first stage based on the negative image.

According to another aspect of the present disclosure, a system for face detection is provided. The system may include a computer-readable storage medium storing executable instructions, and at least one processor in communication with the computer-readable storage medium. When executing the executable instructions, the at least one processor causes the system to determine a plurality of detection scales and determine a detection region in the image based on at least one of the plurality of detection scales. The at least one processor further causes the system to identify one or more faces in the detection region based on the at least one of the plurality of detection scales.

According to another aspect of the present disclosure, a system for face detection is provided. The system may include a computer-readable storage medium storing executable instructions, and at least one processor in communication with the computer-readable storage medium. When executing the executable instructions, the at least one processor causes the system to obtain an image and determine one or more faces in the image by a plurality of classifiers at a first stage. The at least one processor further causes the system to determine a positive image if one or more faces are identified in the image at the first stage, and determine a negative image if no face is identified in the image at the first stage. The at least one processor further causes the system to modify at least one of the plurality of classifiers at the first stage based on the negative image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
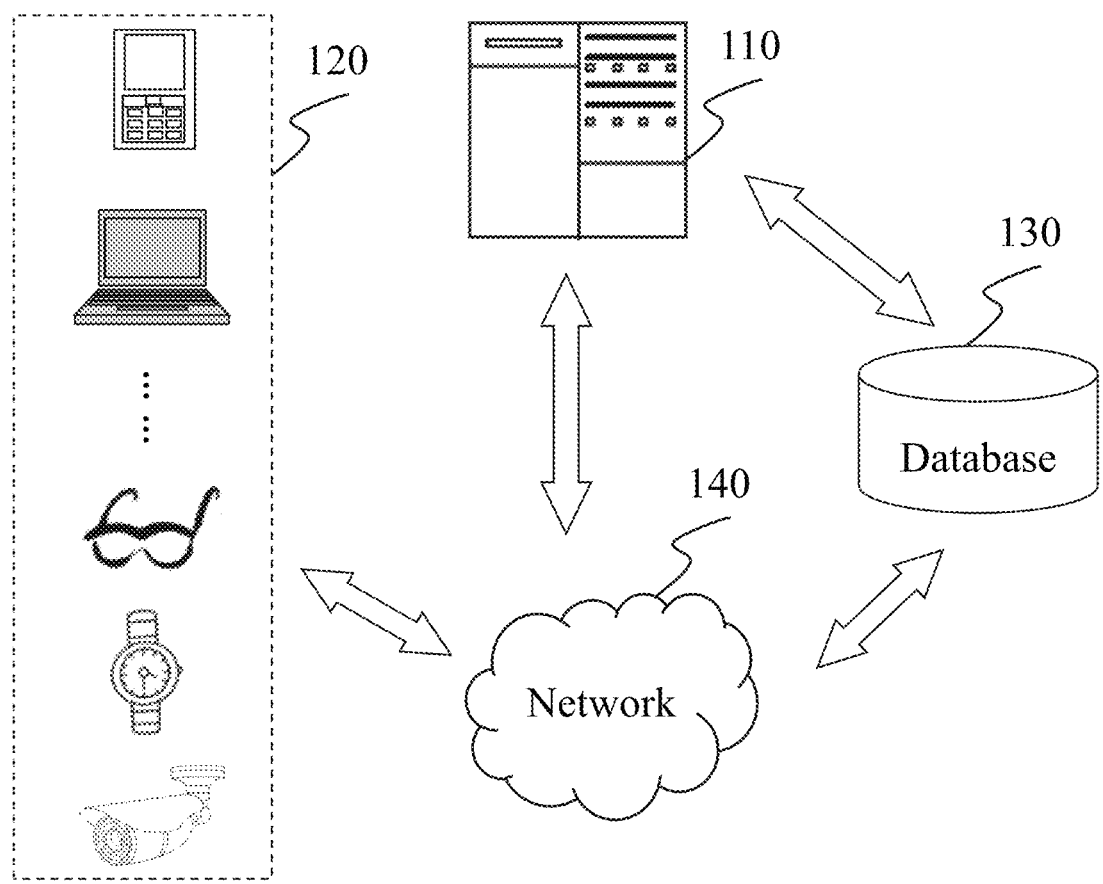
FIG. 1 is a schematic diagram illustrating an exemplary system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, module, systems, devices, and/or drivers have been described at a relatively high-level, without detail, in order to avoid unnecessarily obscuring aspects of the present disclosure.

The terminology used herein is for the purpose of describing particular embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, operations, elements, and/or components, but do not preclude the presence or addition of one or more other features, integers, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The terms "positive image," "negative image," "X/Y coordinate value," "detection scale," and "cascade structure" relating to the detailed description of this application are described as follows. The term "positive image" herein may denote an image in which one or more faces may be detected. The term "negative image" herein may denote an image in which no face is detected. The term "X/Y coordinate value" herein may denote a specific coordinate value of an object in an image, such as the X/Y coordinate value of the center point or any corner. The term "cascade structure" herein may denote a structure including two or more classifier combined to form a compound classifier. The term "detection scale" herein may denote size of a face detected in an image.

FIG. 1 illustrates an exemplary system for face detection according to some embodiments of the present disclosure. As shown, system 100 may include a computing device 110, an image-capture device 120, a database 130, and a network 140.

Computing device 110 may detect an objection (e.g., a face) based on information received, processed, and/or transmitted from other components of system 100 (e.g., database 130). The information received, processed, and/or transmitted by computer device 110 may include programs, software, algorithms, data, text, number, images, voice, video, or the like, or any combination thereof. In some embodiments, computing device 110 may be a server. In some embodiments, computing device 110 may be a server group. A server group may be centralized (e.g., a data center) or distributed (e.g., a distributed group). In some embodiments, computing device 110 may be remote from image-capture device 120. In some embodiments, computing device 110 may be local. In some embodiments, some information may be transmitted to computing device 110 from an external resource, such as a hard disk, a wireless terminal, or the like, or any combination thereof. Computer device 110 may detect an objection based on an algorithm including, for example, Haar-like algorithm, Local Binary Pattern (LBP), Scale Invariant Feature Transform (SIFT) or Speeded Up Robust Features (SURF), Deformable Parts Model (DPM), deep learning algorithm, or the like, or any combination thereof.

Image-capture device 120 may be configured to capture one or more images by way of, for example, a mobile device or a fixed device. The image may include a still picture, a motion picture, a video (offline or live streaming), a frame of a video, or a combination thereof. The mobile device may include a mobile phone, a laptop, a camera, a portable video recorder, a wearable device (e.g., watch, wrist band, shoes, socks, glasses, helmet, clothing, bag, walking stick, accessory, etc.), or any combination thereof. The fixed device may include a monitor, a video camera fixed in a machine (e.g., an automatic teller machine (ATM), an attendance machine), or any combination thereof. In some embodiments, image-capture device 120 may include some functions of processing the acquired image, such as resizing the image, filtering the image, clipping video files, or the like, or any combination thereof.

Database 130 may be used to store information used or generated by the components of system 100. The information may include programs, software, algorithms, data, text, number, images, voice, video, or the like, or any combination thereof. In some embodiments, database 130 may receive images from computing device 110, image-capture device 120, or other modules or units that may generate or process the images. In some embodiments, database 130 may store video streams, original images, identified images with identified faces, and/or any other data provided by one or more components of system 100.

Database 130 may be connected to or communicate with computing device 110, image-capture device 120, and/or any other component of system 100 via a wireless connection or wired connection. A wired connection may include using a metal cable, an optical cable, a hybrid cable, a connection via universal serial bus (USB), a FireWire (IEEE 1394a or 1394b), an ultra-high speed (UHS) bus, a coaxial cable, a twisted pair cabling, or the like, or any combination thereof. A wireless connection may include using a Wireless Local Area Network (WLAN), a Wide Area Network (WAN), a Bluetooth, a Zig Bee, a Near Field Communication (NFC), or the like, or any combination thereof.

Network 140 may facilitate exchange of information between components of system 100. The network 140 may be any suitable computer network such as the Internet, an intranet, a wide-area network ("WAN"), a local-area network ("LAN"), a wireless network, a digital subscriber line ("DSC") network, a frame relay network, an asynchronous transfer mode ("ATM") network, a virtual private network ("VPN"), a satellite network, a mobile phone network, a mobile data network, a cable network, a telephone network, a fiber optic network, or any other suitable communication network, or any combination thereof. Alternatively or additionally, network 140 may be composed by several components of system 100 in one single hardware connected by a bus, such as a system bus.

In some embodiments, each of computing device 110, image-capture device 120 and database 130 may include a general purpose device such as a computer or a special purpose device such as a client, a server, and/or any other suitable device. Any of these general or special purpose devices may include any suitable components such as a hardware processor (which may be a microprocessor, digital signal processor, a controller, and/or any other suitable hardware processor, memory, communication interfaces, display controllers, input devices, and/or any other suitable components) configured to perform the functions of these components disclosed in this application. For example, each of computing device 110, image-capture device 120, and database 130 may be implemented as or include a personal computer, a tablet computer, a wearable computer, a multimedia terminal, a mobile telephone, a gaming device, a set-top box, a television, or the like. Moreover, each of computing device 110, image-capture device 120 and database 130 may include a storage device, which may include a hard drive, a solid state storage device, a removable storage device, and/or any other suitable storage device. Each of computing device 110, image-capture device 120 and database 130 may be located at any suitable location. Each of computing device 110, image-capture device 120 and database 130 may be implemented as a stand-alone device or integrated with other components of system 100. System 100 can find its applications in medical systems, industrial detection systems, security systems, transportation systems, customs systems, and/or any other system that may utilize face detection techniques disclosed herein.

It should be noted that the above description about system 100 is merely an example, should not be understood as the only embodiment. Obviously, to those skilled in the art, after understanding the basic principles of the connection between different devices, the devices and connection between the devices may be modified or varied without departing from the principles. The modifications and variations are still within the scope of the current disclosure described above. For example, the assembly and/or function of system 100 may be varied or changed according to specific implementation scenarios. Merely by way of example, some other components may be added into system 100, such as a camera or video, a storage unit, or the like, or any combination thereof. However, those variations and modifications do not depart from the scope of the present disclosure.

Figure 2:
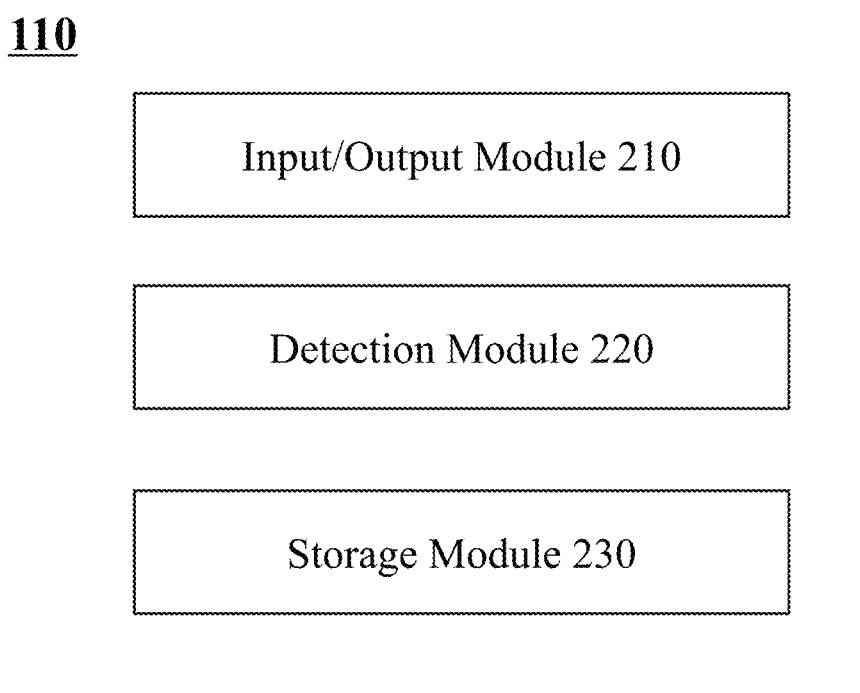
FIG. 2 is a block diagram illustrating an exemplary device for face detection according to some embodiments of the present disclosure.

FIG. 2 illustrates an exemplary device for face(s) detection according to some embodiments of the present disclosure. Computing device 110 may include an input/output module 210, a detection module 220, and a storage module 230. Generally, the words "module," "unit," or "sub-unit," as used herein, refer to logic embodied in hardware or firmware, or to a collection of software instructions. The modules described herein may be implemented as software and/or hardware modules and may be stored in any type of non-transitory computer-readable medium or other storage device. In some embodiments, a software module may be compiled and linked into an executable program. It will be appreciated that software modules can be callable from other modules or from themselves, and/or can be invoked in response to detected events or interrupts. Software modules configured for execution on computing devices (e.g., processor 310 illustrated in FIG. 3) can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules can be included of connected logic units, such as gates and flip-flops, and/or can be included of programmable units, such as programmable gate arrays or processors. The modules or computing device functionality described herein are preferably implemented as software modules, but can be represented in hardware or firmware. In general, the modules described herein refer to logical modules that can be combined with other modules or divided into sub-modules despite their physical organization or storage.

In some embodiments, more or less components may be included in computing device 110. For example, two of the modules may be combined into a single module, or one of the modules may be divided into two or more modules. In some embodiments, one or more of the modules may reside on different computing devices (e.g., desktops, laptops, mobile phones, tablet computers, wearable computing devices, etc.).

Input/output module 210 may receive information from or output information to detection module 220, storage module 230, or any other components of system 100. The information received or output by input/output module 210 may include programs, software, algorithms, data, text, number, images, voice, video, or the like, or any combination thereof. In some embodiments, input/output module 210 may receive one or more images and transmit the received images to detection module 220. Exemplary image may include a composite image, an image generated based on a series of scans of a region of interest (ROI), an overlapping image of the sub-images relating to a ROI, or the like, or any combination thereof. In some embodiments, input/output module 210 may output the identified faces generated by detection module 220 to, for example, database 130. In some embodiments, input/output module 210 may output information received from an external resource, such as a hard disk, a wireless terminal, or the like, or any combination thereof.

Detection module 220 may detect one or more faces in the image received from, for example, input/output module 210, storage module 230, database 130, or any other device that is capable of capturing or acquiring an image. Detection module 220 may perform face detection by determining a detection region and identifying faces in the detection region by a detection scale. In some embodiments, identified face(s) may be generated by detection module 220. In some embodiments, an image may be classified into a positive image or a negative image by detection module 220 based on the result of determination whether there is any face detected in the image. Detection module 220 may perform face detection on images based on any suitable technique or any combination of techniques, such as Haar-like, LBP, SIFT or SURF, DPM, deep learning algorithm, or the like, or any combination thereof.

Storage module 230 may store information relating to face detection. The information relating to face detection may include programs, software, algorithms, data, text, number, images, voice, video, or the like, or any combination thereof. For example, storage module 230 may store the original image, and/or the modified image (e.g., labeling any face detected). As another example, some parameters or conditions for initiating a face detection by a user or an operator may be stored in storage module 230. Exemplary parameters or conditions may include the detection scale, the detection region, a detection algorithm, or the like, or any combination thereof. As another example, some information may be transmitted from external resource, such as a hard disk, a wireless terminal, or the like, or any combination thereof, to storage module 230. It should be noted that the above description about storage module 230 is merely an example according to some embodiments of the present disclosure. In some embodiments, storage module 230 may be implemented on memory 320.

Input/output module 210, detection module 220, and storage module 230 may be connected to or communicate with each other, or other components of system 100 via any suitable communication connection, such as one or more wired or wireless connections. Examples of a wired connection may include a metal cable, an optical cable, a hybrid cable, a connection via universal serial bus (USB), a FireWire (IEEE 1394a or 1394b), an ultra-high speed (UHS) bus, a coaxial cable, a twisted pair cabling, or the like, or any combination thereof. Examples of a wireless connection may include a Wireless Local Area Network (LAN), a Wide Area Network (WAN), a Bluetooth connection, a Zig Bee, a Near Field Communication (NFC), the like, or any combination thereof. In some embodiments, input/output module 210, detection module 220, and storage module 230 may be coupled to each other directly, or through an intermediate unit. The intermediate unit may be a visible component or an invisible field (radio, optics, sonic wave, electromagnetic induction, etc.).

It should be noted that the above description about device for face(s) detection is merely an example, should not be understood as the only embodiment. Obviously, to those skilled in the art, after understanding the basic principles of the connection between different devices, the devices and connection between the devices may be modified or varied without departing from the principles. The modifications and variations are still within the scope of the current disclosure described above. For example, the assembly and/or function of computing device 110 may be varied or changed according to specific implementation scenarios. Merely by way of example, some other components may be added into device 110, such as an amplifier unit, an analog-to-digital converter, a digital-to-analog converter, an interface circuit, or the like, or any combination thereof. However, those variations and modifications do not depart from the scope of the present disclosure.

Figure 3:
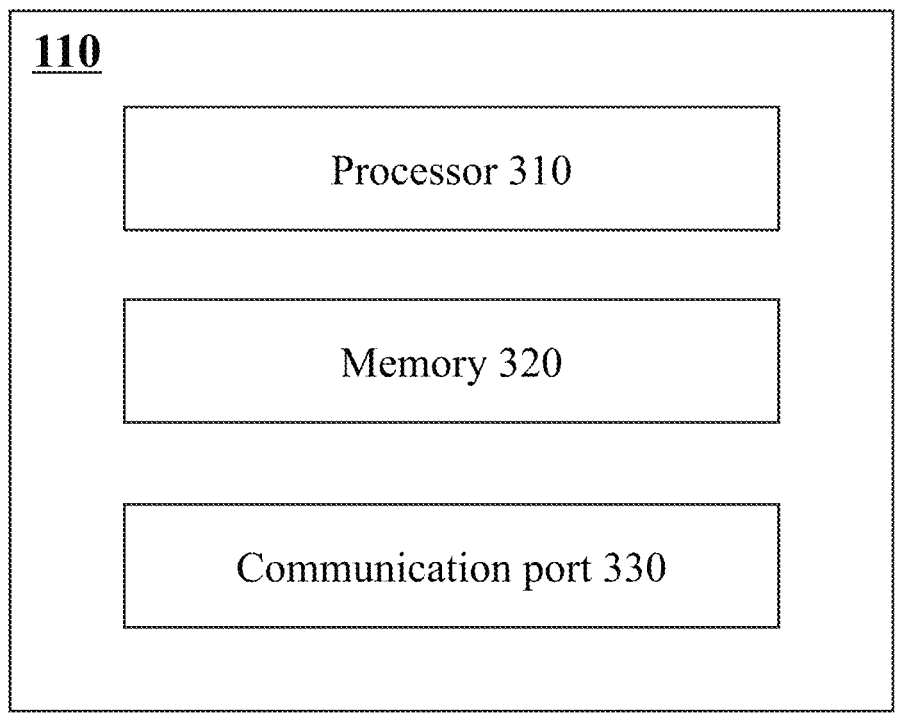
FIG. 3 is a block diagram illustrating exemplary components of a detection system according to some embodiments of the present disclosure.

FIG. 3 is a block diagram illustrating exemplary hardware and software components of computing device 110. As shown, computing device 110 may include a processor 310, a memory 320, and a communication port 330.

Processor 310 may execute computer instructions (program code) and perform functions of computing device 110 in accordance with techniques described herein. The computer instructions executed by processor 310 may be stored in memory 320 or other suitable storage device. Computer instructions may include routines, programs, objects, components, data structures, procedures, modules, and functions, which cause computing device 110 to perform particular functions described herein when executed by processor 310. For example, processor 310 may process the data or information received from input/output module 210, detection module 220, storage module 230, or any other component of computing device 110. In some embodiments, processor 310 may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof. For example, processor 310 may include a microcontroller to process the data from input/output module 210 and the storage module 230 for detection.

Memory 320 may store the data or information received from input/output module 210, detection module 220 and storage module 230, or any other component of computing device 110. In some embodiments, memory 320 may include a mass storage, a removable storage, a volatile read-and-write memory, a read-only memory (ROM), or the like, or any combination thereof. For example, the mass storage may include a magnetic disk, an optical disk, a solid-state driver, etc. The removable storage may include a flash drive, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, memory 320 may store one or more programs and/or instructions to perform exemplary methods described in the present disclosure. For example, memory 320 may store a program for processor 310 for face detection.

Communication port 330 may transmit to and receive information or data from input/output module 210, detection module 220 and storage module 230 via network. In some embodiments, communication port 330 may include a wired port (e.g., a Universal Serial Bus (USB) port, a High Definition Multimedia Interface (HDMI) port, or the like) or a wireless port (a Bluetooth port, an infrared interface, a WiFi port, or the like).

Figure 4:
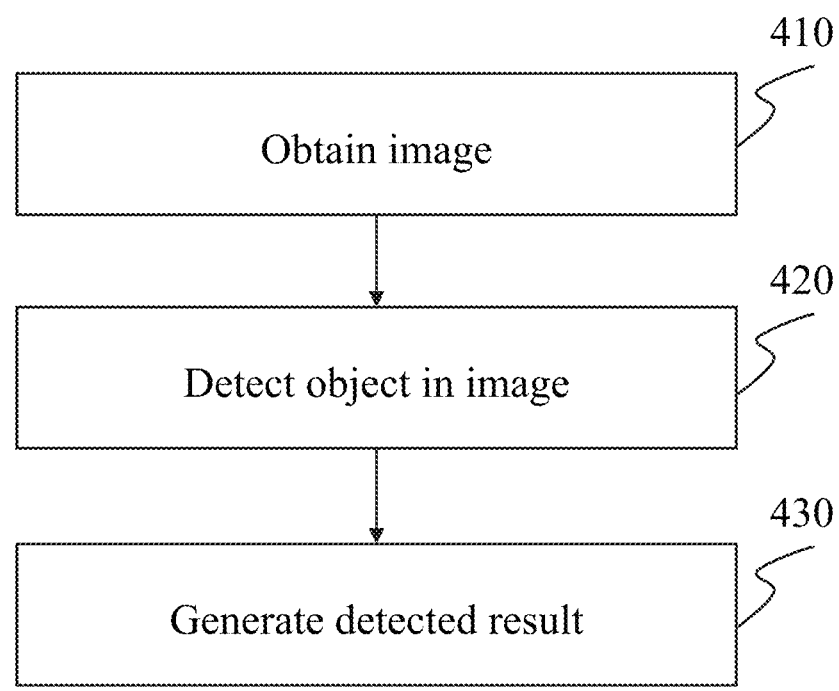
FIG. 4 is a flowchart illustrating an exemplary process for detecting an object according to some embodiments of the present disclosure.

FIG. 4 is a flowchart illustrating an exemplary process for detecting an object in the image according to some embodiments of the present disclosure. In some embodiments, process 400 may be performed by computing device 110.

In 410, an image may be obtained. In some embodiments, the image may be obtained by detection module 220. In some embodiments, the image may be received from any suitable storage devices (e.g., database 130 illustrated in FIG. 1, storage module 230 illustrated in FIG. 2, memory 320 illustrated in FIG. 3) or any suitable imaging device (e.g., image-capture device 120 illustrated in FIG. 1). In some embodiments, image may be received from an external resource, such as a hard disk, a wireless terminal, or the like, or any combination thereof. In some embodiments, the image may be captured by different sensors and/or imaging devices, from different viewpoints, at different times, etc. In some embodiments, the image may contain a plurality of objects. For example, the image may contain one or more faces.

In 420, an object in the image may be detected. In some embodiments, the object may be detected by detection module 220. The object may include a body (or part thereof), a tissue, an organ, a specimen, a substance, or the like, or any combination thereof. In some embodiments, the object may include a face, a head, an eye, a nose, a mouth, an ear, an arm, a leg, an up body part, a lung, a pleura, a mediastinum, an abdomen, a long intestine, a small intestine, a bladder, a gallbladder, a triple warmer, a pelvic cavity, a backbone, extremities, a skeleton, a blood vessel, or the like, or any combination thereof. In some embodiments, one or more faces in the image may be detected by performing one or more algorithm including, for example, Haar-like algorithm, LBP, SIFT or SURF, DPM, deep learning algorithm, or the like, or any combination thereof. In some embodiments, the face may be detected by performing one or more operations described in connection with FIG. 6 below.

In 430, a detected result may be generated according to the object detection performed. In some embodiments, the detected result may be generated by detection module 220. In some embodiments, identified object(s) may be generated as the detected result (e.g., a portion of the image extracted that includes the identified object(s), an image includes the identified object(s)). Alternatively or additionally, the image may be classified into a positive image or a negative image. In some embodiments, the detected result may be stored in any suitable storage devices (e.g., database 130 illustrated in FIG. 1, storage module 230 illustrated in FIG. 2, or memory 320 illustrated in FIG. 3). In some embodiments, the detected result may be output to a device for further processing, presentation, storage, transmission, etc. For example, the detected result may be further used to calibrate the detecting process in connection with step 420.

It should be noted that the above description of process 400 is merely provided for the purposes of illustration, and not intended to be understood as the only embodiment. For persons having ordinary skills in the art, various variations and modifications may be conduct under the teaching of some embodiments of the present disclosure. However, those variations and modifications may not depart from the protecting of some embodiments of the present disclosure. For example, a plurality of images may be obtained in 410. Thus, a plurality of object in images may be detected in 420 and a plurality of detected results may be generated in 430.

Figure 5:
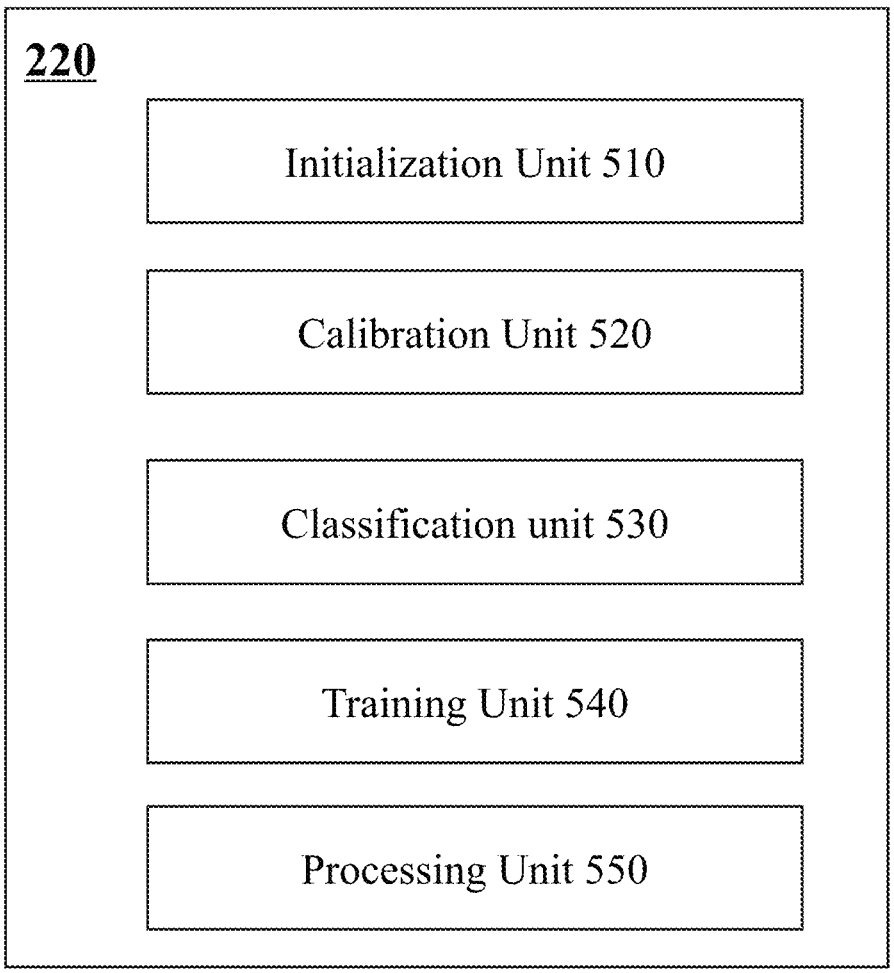
FIG. 5 is a block diagram illustrating an exemplary module for face detection according to some embodiments of the present disclosure.

FIG. 5 illustrates an exemplary block diagram for face detection according to some embodiments of the present disclosure. As shown, detection module 220 may include an initialization unit 510, a calibration unit 520, a classification unit 530, a training unit 540, and a processing unit 550. More or less components may be included in detection module 220. For example, two of the units may be combined into a single unit, or one of the units may be divided into two or more units. In some embodiments, one or more of the units may reside on different computing devices (e.g., desktops, laptops, mobile phones, tablet computers, wearable computing devices, etc.).

Initialization unit 510 may determine a detection scale for detecting one or more objects (e.g., a face) in an image. Alternatively or additionally, initialization unit 510 may determine a detection region where one or more objects may be detected according to the detection scale. In some embodiments, the detection scale and the detection region may be correlated with each other. For example, a detection region may be determined based on a detection scale. Specifically, a larger detection scale may correspond to a detection region that is closer to, for example, the image-taking device (e.g., image-capture device 120). A detection scale may be determined based on a detection region. For example, a detection region that is closer to the image-taking device may correspond to a larger detection scale. In some embodiments, the detection scale and the detection region may be determined independently. For example, at least one of the detection scale and the detection region may be set by default by computing device 110, or may be determined by a user via user input which may be received by computing device 110.

Calibration unit 520 may calibrate the detection region and/or the detection scale. In some embodiments, the detection region corresponding to the detection scale determined by initialization unit 510 may be calibrated. For example, the detection region may be calibrated based on the identified objects, such as faces. In some embodiments, calibration unit 520 may set one or more parameters to calibrate the detection region, such as X/Y coordinate values of faces detected, the amount of faces detected, etc. For example, Y coordinate values of the identified faces corresponding to a detection scale may be analyzed to calibrate the position or the size of the detection region.

Classification unit 530 may identify face(s). Further, classification unit 530 may determine whether there is any face identified in the image. In some embodiments, the classification unit 530 may contain one or more classifiers. The classifiers may use a same or different algorithms to identify face(s). Classification unit 530 may be performed based on an algorithm including, for example, Haar-like algorithm, LBP, SIFT or SURF, DPM, deep learning algorithm, or the like, or any combination thereof.

Training unit 540 may train classification unit 530 or any other component that can identify face(s). In some embodiments, training unit 540 may modify the performance of classification unit 530 by analyzing the images in which one or more faces have been detected and/or the images in which no face has been detected. In some embodiments, negative images may be used to train classification unit 530. Specifically, a hard negative mining may be performed to modify the negative image before training. The hard negative mining may be a method of reducing generalization ability of an algorithm and over fitting by modifying the negative sample. Details regarding the hard negative mining may be found elsewhere in the disclosure (e.g., the description in connection with FIG. 9).

Processing unit 550 may preprocess or process the image before and/or after face detection. The image may be received from different modules/units including image-capture device 120, database 130, input/output module 210, storage module 230, memory 320, initialization unit 510, or other modules/units. In some embodiments, processing unit 550 may process the image by using an image processing technique or combination of techniques, such as lens distortion correction, spherical aberration correction, coma correction, astigmatism correction, chromatic aberration correction, defocus correction and lens tilt calibration, white-balance calibration, noise reduction, deblurring, edge detection, high dynamic range (HDR) processing, shake reduction, image compression, or the like, or any combination thereof. For example, processing unit 550 may smooth the image based on the detection region corresponding to the detection scale for identifying faces.

It should be noted that the above description about detection module 220 is merely an example, should not be understood as the only embodiment. Obviously, to those skilled in the art, after understanding the basic principles of the connection between different devices, the devices and connection between the devices may be modified or varied without departing from the principles. The modifications and variations are still within the scope of the current disclosure described above. For example, the assembly and/or function of detection module 220 may be varied or changed according to specific implementation scenarios. For example, classification unit 530 may have the function of training unit 540. However, those variations and modifications do not depart from the scope of the present disclosure.

Figure 6:
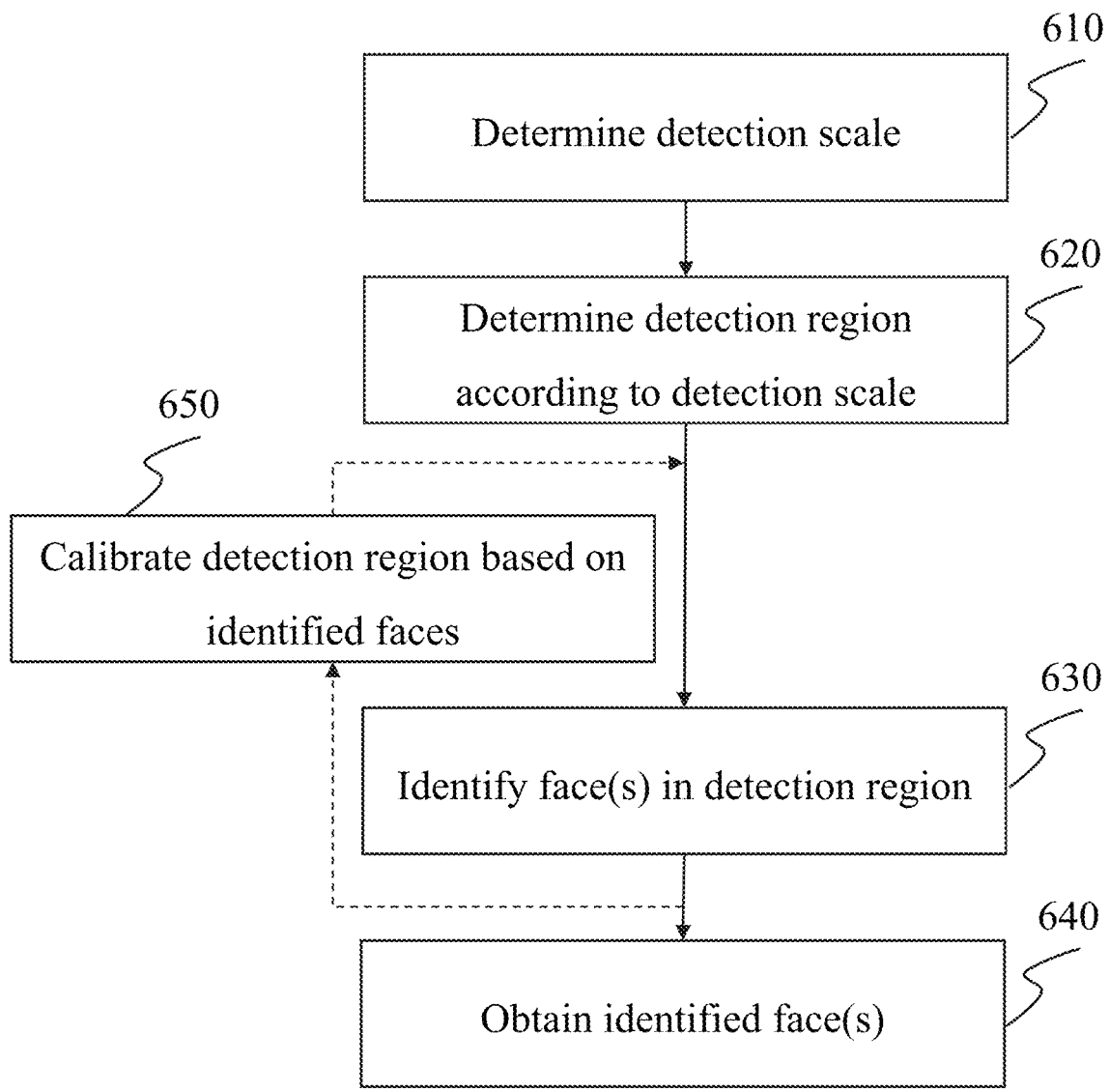
FIG. 6 is a flowchart illustrating an exemplary process for face detection according to some embodiments of the present disclosure.

FIG. 6 is a flowchart illustrating an exemplary process for face detection according to some embodiments of the present disclosure. In some embodiments, process 600 may be performed by detection module 220. In some embodiments, step 420 illustrated in process 400 may be performed according to process 600.

In 610, a detection scale may be determined. In some embodiments, a detection scale may be determined by initialization unit 510. The determined detection scale may correspond to one or more scales of faces in an image obtained by, for example, an image capturing device (e.g., image-capture device 120 illustrated in FIG. 1). In some embodiments, the detection scale may be determined based on the size of the image obtained. In some embodiments, the detection scale may be determined based on a preset parameter of computing device 110. In some embodiments, the detection scale may be set by a user or an operator according to a specific condition. The scales of faces in an image may be different. In some embodiments, images corresponding to different photography scenes and shooting angles of cameras or videos with respect to a certain plane (e.g., the horizontal plane) may have different scales of faces. In some embodiments, the detection scale may be related to the resolution and/or size of an image. The detection scale may be a rectangular that is defined by a length and a width. In some embodiments, the ratio of the length and the width may be 1:1. For example, detection scale may be 28*28, 80*80, or 224*224 dpi, etc. In some embodiments, the ratio of the length and the width may be 3:2, 4:3, 5:4, etc. In some embodiments, the detection scale may be a circle that is defined by a radius. In some embodiments, the detection scale may be an ellipse. In some embodiments, the detection scale may be an irregular shape, such as a shape fitting the outline of a face.

In 620, a detection region may be determined according to the determined detection scale. In some embodiments, a detection region may be determined by initialization unit 510. For illustration purpose, it is assumed that the scale of a face that is away from image-capture device 120 is smaller than the scale of a face that is close to image-capture device 120. A larger scale of detection scale may correspond to a detection region that is closer to image-capture device 120. In some embodiments, the detection region may be the full scope of the image such that only one detection scale may be used to detect one or more faces in the image. In some embodiments, the detection region may be a certain portion of the image. For example, the detection region may be a region with X/Y coordinate values (i.e., representing the positions of the pixels) being within a certain range. In some embodiments, the detection regions corresponding to different detection scales may be different regions isolated from each other in the image. In some embodiments, the detection regions corresponding to different detection scales may have some portions overlapped.

In 630, one or more faces corresponding to the detection scale may be detected in the detection region determined in 620. In some embodiments, one or more faces corresponding to the detection scale may be detected by computing device 110, detection module 220, or classification unit 530. Various face detection algorithms may be used to detect one or more faces in a detection region. In some embodiments, a cascade structure including more than one classifier may be applied to detect one or more faces. For example, the cascade structure may be achieved by more than one classifier using an algorithm including Haar-like, LBP (Local Binary Pattern), SIFT (Scale Invariant Feature Transform), or SURF (Speeded Up Robust Features), or the like, or a combination thereof. In some embodiments, DPM (Deformable Parts Model) may be applied to detect one or more faces. In some embodiments, deep learning algorithm may be applied to detect face(s).

In 640, the identified face(s) may be obtained. In some embodiments, the identified face(s) may be obtained by computing device 110, detection module 220, or classification unit 530. In some embodiments, the identified face(s) may be positive image(s). In some embodiments, the identified face(s) may be output to a device, module, or unit for further processing, presentation, storage, transmission, etc.

For example, the identified face(s) may be stored and analyzed to update the process as illustrated elsewhere in the disclosure to detect face(s).

In 650, the detection region may be calibrated based on the identified face(s). In some embodiments, the detection region may be calibrated by calibration unit 520. The detection region corresponding to a detection scale may be updated for further face detection. For example, the scale of the detection region may be updated based on, for example, the number of faces identified in the detection region. Merely by way of example, if the number of face(s) identified in the detection region is equal to or greater than a threshold, the scale of the detection region may be increased. As another example, if the number of face(s) detected is less than a threshold, the detection region may be calibrated. The threshold may be set by default by computing device 110, or may be set manually by an operator according to a certain condition. In some embodiments, the scale of the detection region may be calibrated based on the positions of identified faces in the image. Details of an exemplary calibration of the detection region will be described elsewhere in this disclosure in connection with FIG. 7. In some embodiments, if the detection accuracy of the identified face(s) in 640 meets a criterion (e.g., the detection accuracy is equal to or greater than a threshold), calibration in 650 for calibrating the detection region is not performed. In some embodiments, the calibration as illustrated in 650 may be terminated according to a preset condition. For example, the calibration may be terminated when a specific number (e.g., 1, 3, 4, 6, or other positive integers) of calibration has been performed. As another example, the calibration may be terminated when the number of face(s) identified in successive loops are the same.

It should be noted that the above description of process 600 is merely provided for the purposes of illustration, and not intended to be understood as the only embodiment. For persons having ordinary skills in the art, various variations and modifications may be conduct under the teaching of some embodiments of the present disclosure. However, those variations and modifications do not depart from the protecting of some embodiments of the present disclosure. For example, the detection scale may also be calibrated based on the identified face(s) in 650. The detection scale may be updated based on, for example, the number of faces identified in the detection region. Merely by way of example, if the number of face(s) identified in the detection region is equal to or greater than a threshold, the detection scale may remain unchanged. As another example, if the number of face(s) identified in the detection region is less than a threshold, the detection scale may be calibrated, such as enlarging or reducing the detection scale. The threshold may be set by default by computing device 110, or may be set manually by an operator according to a certain condition. In some embodiments, the scale of the detection region may be calibrated based on the positions of detected faces in the image. As still another example, a plurality of detection scales may be determined in 610 for detecting faces of different sizes. A plurality of detection regions corresponding to the detection scales may be determined in 620, and a plurality of faces corresponding to the plurality of detection scales may be identified in 630. Merely by way of example, three different detection scales may be determined in an image for face detection.

Figure 7:
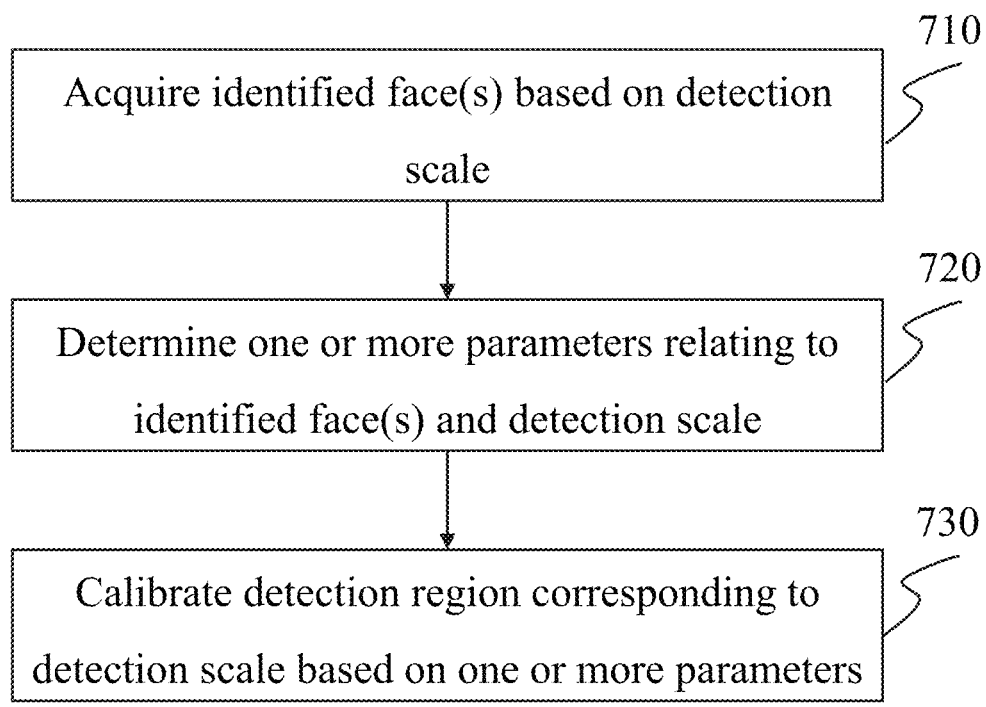
FIG. 7 is a flowchart illustrating an exemplary process for calibrating a detection region according to some embodiments of the present disclosure.

FIG. 7 is a flowchart illustrating an exemplary process for calibrating the detection region according to some embodiments of the present disclosure. In some embodiments, process 700 may be performed by calibration unit 520. In some embodiments, step 650 of process 600 may be performed according to process 700.

In 710, the identified face(s) based on a detection scale may be acquired. In some embodiments, the identified face(s) may be acquired from database 130, storage module 230, memory 320, and/or any other device that can provide images. In some embodiments, the identified face(s) may be positive images. In some embodiments, the identified face(s) may be obtained according to step 640 illustrated in FIG. 6. In some embodiments, images with the identified face(s) may be acquired from one or more database (e.g., database 130 illustrated in FIG. 1). In some embodiments, images with the identified face(s) may be acquired from external resource, such as a hard disk, a wireless terminal, or the like, or any combination thereof.

In 720, one or more parameters relating to the identified face(s) and the detection scale may be determined. In some embodiments, one or more parameters may be determined by calibration unit 520. In some embodiments, the parameter(s) may relate to the location(s) of the identified face(s) in the image. For example, the parameters may be X or Y coordinate value(s) of the identified face(s) in the image. In some embodiments, the parameter(s) may be the scale(s) of the identified face(s). In some embodiments, the parameter(s) may be the scale of (or size or resolution of) the image. In some embodiments, the parameter may be the number of the identified faces in the image.

In 730, the detection region corresponding to the detection scale may be calibrated based on the one or more parameters. In some embodiments, the detection region corresponding to the detection scale may be calibrated by calibration unit 520. In some embodiments, an updated detection region corresponding to the detection scale may be generated. Merely by way of example, X/Y coordinate value(s) of the identified face(s) corresponding to a detection scale may be processed to obtain a characteristic value. Exemplary characteristic value may include average of the X/Y coordinate values, the detection scale, the number of the identified faces. Alternatively, a threshold may be provided, and an updated detection region corresponding to the detection scale may be generated based on the characteristic value and the threshold. For example, the detection region may be updated by setting the center of the detection region at the average X/Y coordinate value of, for example, the center or the corner of the identified face(s), and setting the threshold as the length or the width of the detection region.

It should be noted that the above description of process 700 is merely provided for the purposes of illustration, and not intended to be understood as the only embodiment. For persons having ordinary skills in the art, various variations and modifications may be conduct under the teaching of some embodiments of the present disclosure. However, those variations and modifications may not depart from the protecting of some embodiments of the present disclosure. For example, the detection scale may also be calibrated based on the identified face(s). The detection scale may be updated based on, for example, the number of faces detected. For instant, if the number of faces detected is more than a threshold value, the detection scale may be appropriate. As another example, if the number of faces identified in the detection region is less than a threshold, the detection scale may be calibrated, such as enlarging or reducing detection scale. The threshold may be set by default by computing device 110, or may be set manually by an operator according to a certain condition. As another example, the identified faces based on a plurality of detection scales may be acquired in 710, and a plurality of detection regions corresponding to the detection scales may be calibrated in 730 respectively. As still another example, parameters determined in 720 may depend on the identified face(s) and corresponding detection scales.

Figure 8:
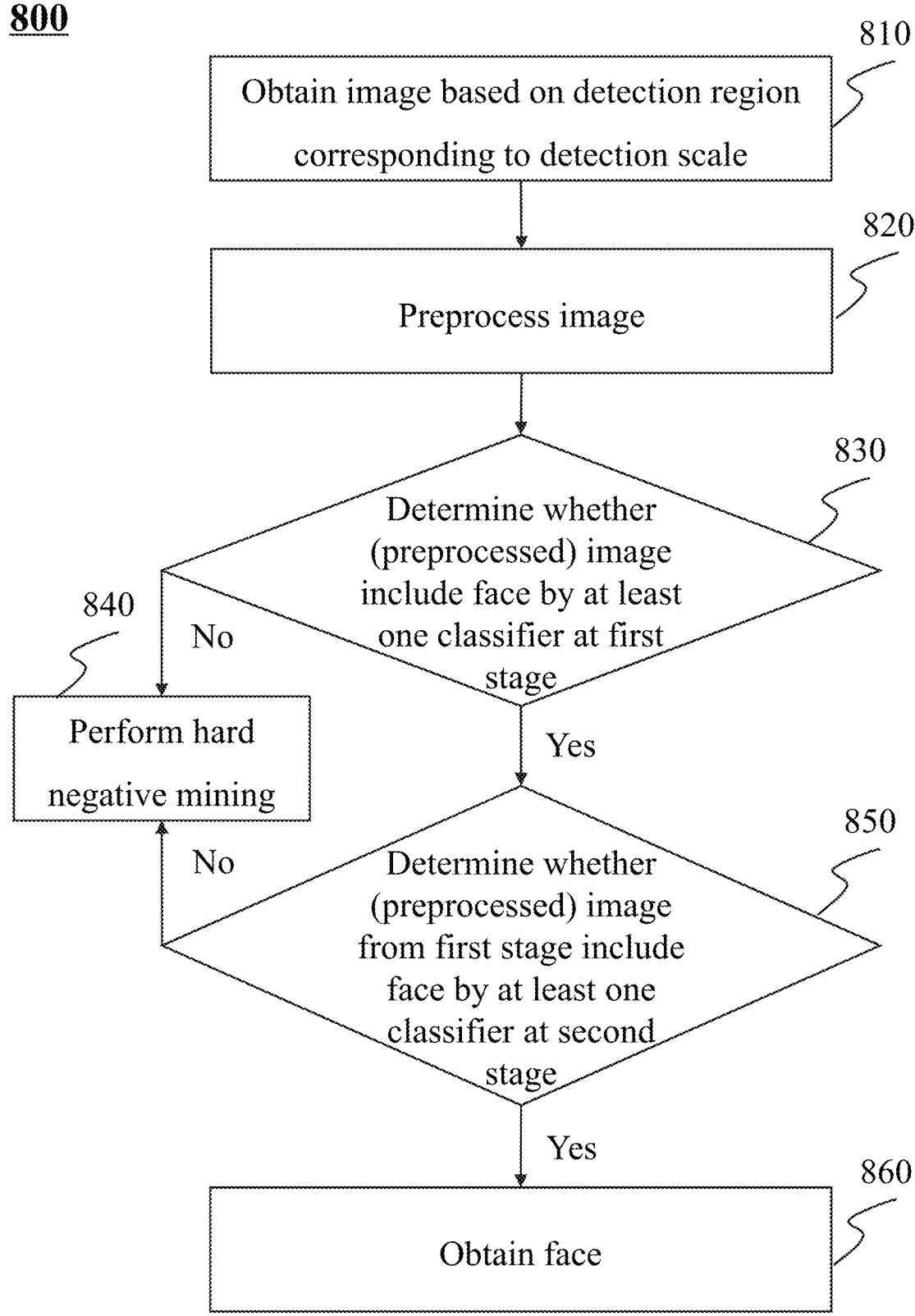
FIG. 8 is a flowchart illustrating an exemplary process for identifying face according to some embodiments of the present disclosure.

FIG. 8 is a flowchart illustrating an exemplary process for identifying face(s) according to some embodiments of the present disclosure. In some embodiments, process 800 may be performed by detection module 220. In some embodiments, step 630 illustrated in process 600 may be performed according to process 800. Details regarding modified soft-cascade may be found elsewhere in the disclosure. See, for example, the description of FIG. 10.

In 810, an image may be obtained based on the detection region corresponding to the detection scale. In some embodiments, the image may be obtained from database 130, storage module 230, memory 320, and/or any other device that can provide images. In some embodiments, the image may be obtained from initialization unit 510.

In 820, the image may be preprocessed. In some embodiments, the image may be preprocessed by processing unit 550. The preprocessed image may be generated by using an image processing technique, such as lens distortion correction, spherical aberration correction, coma correction, astigmatism correction, chromatic aberration correction, defocus correction and lens tilt calibration, white-balance calibration, noise reduction, deblurring, edge detection, high dynamic range (HDR) processing, shake reduction, image compression, or the like, or any combination thereof. In some embodiments, the preprocessed image may be stored for further processing.

In 830, whether the preprocessed image includes one or more faces may be determined by at least one classifier at a first stage. In some embodiments, the determination may be performed by classification unit 530 illustrated in FIG. 5. A classifier performing face detection on image may be based on an algorithm such as Haar-like, LBP, SIFT or SURF, DPM, deep learning, or the like, or any combination thereof. If the image includes at least one face, the image may be designated as a positive image, and process 800 may proceed to step 850. If no face is detected in the image, the image may be designated as a negative image, and process 800 may proceed to step 840. In some embodiments, a negative image may be used to train classifiers as a negative sample. For example, hard negative mining may be performed to modify the negative image in 840. In some embodiments, classifiers at the first stage may be a cascade structure. For example, a soft-cascade. In some embodiments, the last classifier at the first stage may be a post classifier.

In 840, hard negative mining may be performed on the negative images determined in 830. In some embodiments, hard negative mining may be performed by training unit 530 illustrated in FIG. 5. In some embodiments, the process of hard negative mining may include resizing the image, rotating the image, changing the hue or saturation of the image, or the like, or a combination thereof. The negative image may be used to train one or more classifiers. Details regarding hard negative mining may be found elsewhere in the disclosure.

In 850, whether the positive image includes one or more faces may be further determined by at least one classifier at a second stage. In some embodiments, the determination may be performed by classification unit 530 illustrated in FIG. 5). A classifier performing face detection on images may be based on an algorithm such as Haar-like algorithm, LBP, SIFT or SURF, DPM, deep learning algorithm, or the like, or any combination thereof. If the image includes at least one face, the image may be designated as a positive image, and process 800 may proceed to step 850. If no face is included in the image, the image may be designated as a negative image, and process 800 may proceed to step 840. In some embodiments, the negative image may be used to train classifiers as a negative sample. For example, hard negative mining may be performed to modify negative image in 840. In some embodiments, classifiers at the second stage may be a cascade structure. For example, a soft-cascade. In some embodiments, the last classifier at the first stage may be a post classifier.

In 860, one or more faces may be obtained. In some embodiments, the image with identified face(s) (positive image) may be obtained from classification unit 530. In some embodiments, the identified face(s) may be output to a device for further processing.

It should be noted that the above description of process 800 is merely provided for the purposes of illustration, and not intended to be understood as the only embodiment. For persons having ordinary skills in the art, various variations and modifications may be conduct under the teaching of some embodiments of the present disclosure. However, those variations and modifications may not depart from the protecting of some embodiments of the present disclosure. For example, images of a plurality of detection scales may be obtained in 810. As another example, step 820 may be unnecessary and the image obtained in 810 may be determined in 830 on whether one or more faces are included. As still another example, the positive image obtained in 850 may be further determined by at least one classifier at third stage, fourth stage, etc., on whether one or more faces are included.

Figure 9:
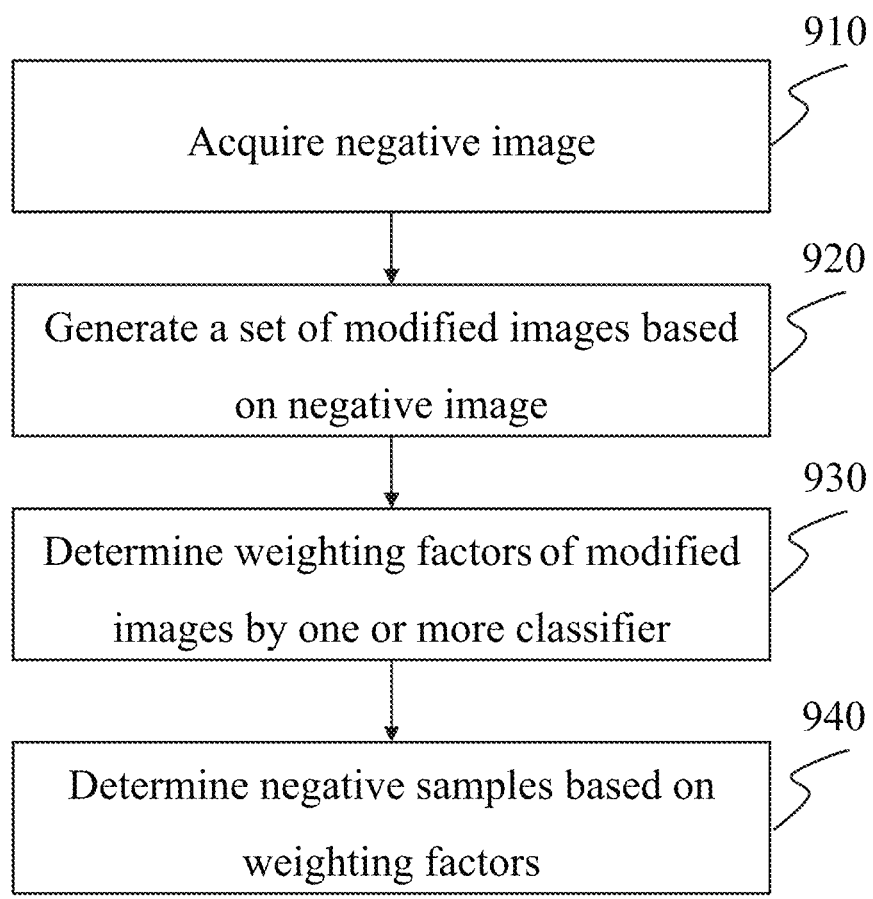
FIG. 9 is a flowchart illustrating an exemplary process for performing hard negative mining according to some embodiments of the present disclosure.

FIG. 9 is a flowchart illustrating an exemplary process for performing hard negative mining according to some embodiments of the present disclosure. In some embodiments, process 900 may be performed by training unit 540 illustrated in FIG. 5. In some embodiments, 840 of process 800 may be performed according to process 900. In 910, a negative image may be acquired. In some embodiments, the negative image may be obtained from database 130, storage module 230, memory 320, etc. In some embodiments, the negative image may be obtained from the classification unit 530. In some embodiments, the negative image may be acquired by step 830 or step 850.

In 920, a set of modified images may be generated based on the negative image. In some embodiments, a set of modified images may be generated by training unit 540. In some embodiments, the negative image may be preprocessed before being modified. For example, preprocessing the negative image may include performing smoothing, thinning, and/or normalization on the negative image. In some embodiments, a guide filter algorithm may be used to smoothing image. The guide filter algorithm may retain the details of the edge while smoothing the noise, and retain the detailed information of the contour of the eye. For illustration purpose, the formula of the guide filter algorithm may be defined as follows:

$$q_i = \Sigma_j W_{ij}(I) p_j \quad (1),$$

where I denotes a guide image, which may be any image, and p is the image to be filtered (e.g., the negative image), q is the output image, and $W_{ij}$ is a weigh matrix.

It may be assumed that there is a local linear relationship between the guide image and the output image, which may be expressed in formula (2):

$$q_i = a_k I_i + b_k \quad (2).$$

In some embodiments, coefficients $a_k$ and $b_k$ may be determined by minimizing the following formula:

$$E(a_k+b_k) = \sum_{i \in w_k}((a_k I_i + b_k - p_i)^2 + \varepsilon a_k^2) \qquad (3).$$

Thus, $$a_k = \frac{\frac{1}{|w|}\sum_{i \in w_k} I_i p_i - \mu_k \overline{p_k}}{\sigma_k^2 + \varepsilon}, \qquad (4)$$

$$b_k = \overline{p_k} - \mu_k a_k, \qquad (5)$$

where $\overline{p_k}$ is defined as:

$$\overline{p_k} = \frac{1}{|w|}\sum_{i \in w_k} p_i. \qquad (6)$$

In some embodiments, a set of modified images may be generated by processing the negative image. The exemplary process may include resizing the image (e.g., zooming the image), rotating or overturning the image, translating the image, changing the hue or saturation of the image, or the like, or any combination thereof.

In 930, weighting factors of the modified images may be determined by one or more classifier. In some embodiments, weighting factors of the modified images may be determined by classification unit 530. In some embodiments, weighting factors of the modified images may represent the probability of including a face in the image. For example, a higher weighting factor may represent that the modified image is more likely to include a face. In some embodiments, more than one classifiers may constitute a cascade structure. In the cascade structure, the classifiers may be used to determine faces in a sequential manner that if an image is identified by a previous identifier, the image may be further identified by a next identifier.

In 940, negative samples may be determined based on the weighting factors. In some embodiments, negative samples may be determined by classification unit 530. In some embodiments, some of the modified images may be selected as negative samples to train classifiers. In some embodiments, the negative samples may be similar to faces, while having higher texture complexity.

It should be noted that the above description of process 900 is merely provided for the purposes of illustration, and not intended to be understood as the only embodiment. For persons having ordinary skills in the art, various variations and modifications may be conduct under the teaching of some embodiments of the present disclosure. However, those variations and modifications may not depart from the protecting of some embodiments of the present disclosure. For example, besides the weighting factors, other factors may also be determined in 930, such as texture complexity, for determining negative samples.

Figure 10:
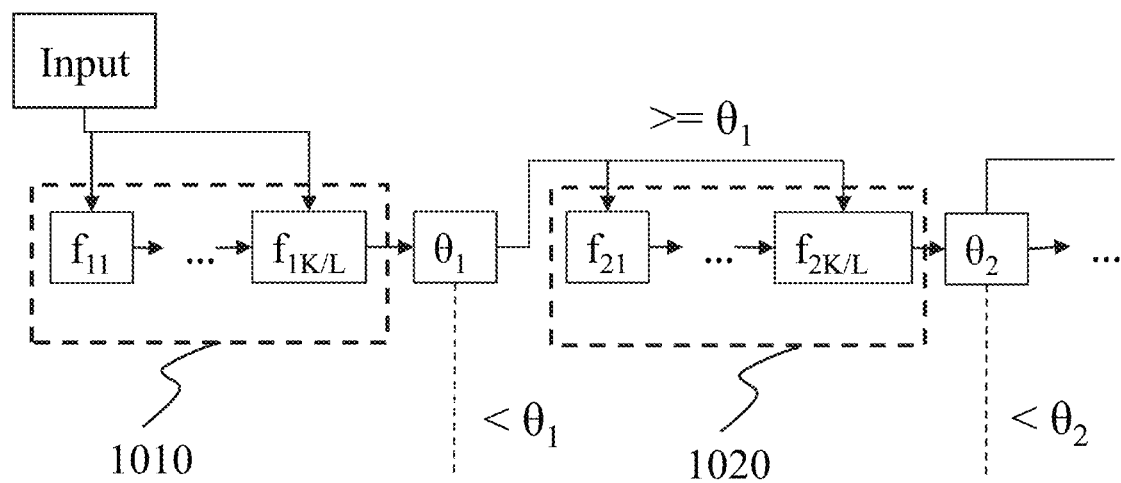
FIG. 10 is a schematic diagram illustrating an exemplary structure of modified soft-cascade according to some embodiments of the present disclosure.

FIG. 10 is a schematic diagram illustrating an exemplary structure of modified soft-cascade according to some embodiments of the present disclosure. As shown, a stage 1000 of the soft-cascade structure is provided. The stage may contain a number of classifiers (e.g., K classifiers). If there is L points in the stage, each point may correspond to a portion of the K classifiers (e.g., K/L classifiers). For illustration purpose, every K/L classifier(s) in the modified soft-cascade may constitute a cluster (e.g., cluster 1010, cluster 1020, etc.), and each cluster corresponds to a threshold $\theta_l$, where l=1, 2, ..., L. The threshold may be set by default by computing device 110, or may be set manually by an operator through a user input according to a certain condition. A classification score $f_i$ may be generated when a sample passes through the K/L classifier(s). The classification score $f_i$ may be determined based on the following formula:

$$f_i = \frac{1}{2}\ln\left(\frac{\sum_{\{y_i=1\}} w_i}{\sum_{\{y_i=-1\}} w_i}\right), \qquad (7)$$

where $w_i$ denotes weigh of sample which is determined based on the following formula:

$$w_i = e^{-y_i f_i} \qquad (8).$$

Based on the classification score $f_i$, a determination may be made on whether to enter the next cluster of classifiers. In some embodiments, the determination may be whether a preset condition (also referred to as "precsion-recall" condition) is met. In some embodiments, each classifier may be based on the classification and regression tree (CART) algorithm, in depth 4.

Figure 11:
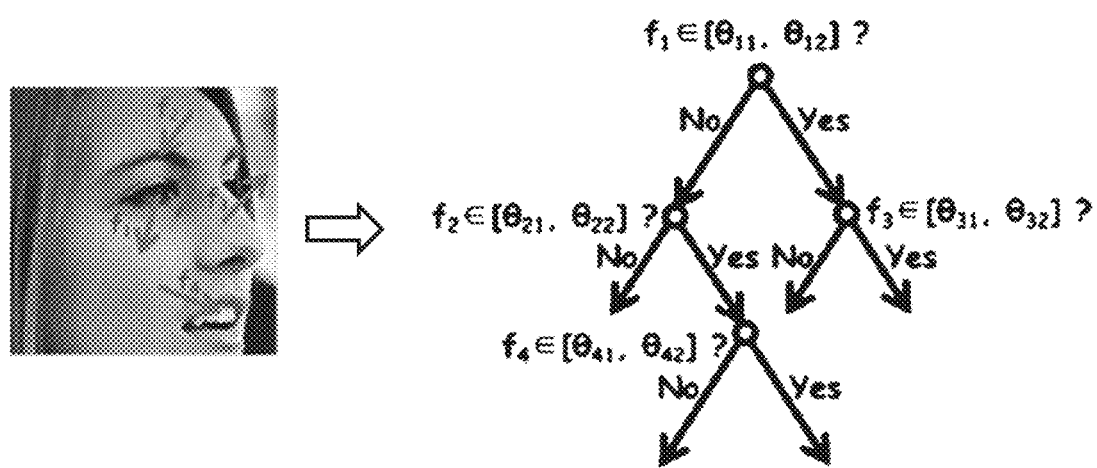
FIG. 11 is a schematic diagram illustrating an exemplary modified classification and regression tree (CART) method according to some embodiments of the present disclosure.

FIG. 11 is a schematic diagram illustrating an exemplary CART method according to some embodiments of the present disclosure. In some embodiments, a method for determining the feature of the pixel difference may be defined as follows:

$$f = |I(x_1 y_1) - I(x_2 y_2)| \qquad (9),$$

where $I(x_1 y_1)$ and $I(x_2 y_2)$ denote the pixel values of two pixels. A modified CART method for determining the feature of the pixel difference (also referred to as "normalized pixel difference (NPD)") may be defined in formula (10):

$$f = \frac{I(x_1 y_1) - I(x_2 y_2)}{I(x_1 y_1) + I(x_2 y_2)}. \qquad (10)$$

If $I(x_1 y_1)$ and $I(x_2 y_2)$ are both equal to zero, f=0. Formula (10) may indicate that the characteristic value f is an integer with a positive or a negative symbol, which may represent the gradient direction of the pixel change. The NPD may avoid problems of characteristic value changing greatly, and the computing complexity is not increased significantly.

In some embodiments, a modified CART method (also referred to as "second-order tree") may be used by applying a second-order polynomial on the feature f based on the following model:

$$af^2 + bf + c < t \qquad (12),$$

where a, b and c are constants about f, and t is a threshold.

The model may utilize the following three divisive structure after training by, for example, training unit 540:

$$\begin{cases} -1 \leq \frac{I(x_1 y_1) - I(x_2 y_2)}{I(x_1 y_1) + I(x_2 y_2)} \leq \theta < 0 \\ 0 < \theta \leq \frac{I(x_1 y_1) - I(x_2 y_2)}{I(x_1 y_1) + I(x_2 y_2)} \leq 1 \\ \theta_1 \leq \frac{I(x_1 y_1) - I(x_2 y_2)}{I(x_1 y_1) + I(x_2 y_2)} \leq \theta_2 \end{cases} \qquad (13)$$

where $\theta_l$ denotes a lower bound threshold, $\theta_2$ denotes an upper bound threshold, and $\theta_l < 0$, $\theta_2 > 0$. In the first structure, the color or grey-level value of $I(x_1y_1)$ is darker than that of $I(x_2y_2)$. See, for example, the arrow "$f_1$" shown in FIG. 11. The pixels around the tail of "$f_1$" are darker the pixels around of the head of "$f_1$". In the second structure, the color or grey-level value of $I(x_1y_1)$ is brighter than that of $I(x_2y_2)$. See, for example, the arrow "$f_2$" shown in FIG. 11. The pixels around the tail of "$f_2$" are brighter the pixels around of the head of "$f_2$". In the third structure, there is an obvious edge or sharp transition between $I(x_1y_1)$ and $I(x_2y_2)$. See, for example, the arrow "$f_3$" and "$f_4$" shown in FIG. 11.

Process 400, 600, 700, 800, and/or 900 may be performed by processing logic that comprises hardware (e.g., circuitry, dedicated logic, programmable logic, microcode, etc.), software (e.g., instructions run on a processing device to perform hardware simulation), and/or a combination thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the operator's computer, partly on the operator's computer, as a stand-alone software package, partly on the operator's computer and partly on a remote computer or entirely on the remote computer or server. In the latter scenario, the remote computer may be connected to the operator's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

We claim:

1. A method implemented on a computing device having at least one processor, at least one computer-readable storage medium, and a communication port, for face detection, the method comprising:
   obtaining an image;
   obtaining a plurality of detection scales, wherein different detection scales are used to detect faces of different sizes;
   determining, for each of the plurality of detection scales, a detection region in the image, wherein a larger detection scale corresponds to a detection region that is closer to an image-capture device that captures the image; and identifying one or more faces in each detection region by its corresponding detection scale, wherein the identifying one or more faces in each detection region comprises:
  determining the one or more faces in the each detection region by a first plurality of classifiers at a first stage;
  determining a negative image in which no face is identified; and
  modifying at least one of the first plurality of classifiers based on the negative image, wherein the modifying at least one of the first plurality of classifiers comprises:
    obtaining the negative image;
    generating a set of modified images based on the negative image;
    determining weighting factors corresponding to the set of modified images according to one or more of the first plurality of classifiers;
    determining one or more negative samples based on the weighting factors; and
    modifying the at least one of the first plurality of classifiers based on the one or more negative samples.

2. The method of claim 1, further comprising calibrating the detection region based on the one or more identified faces.

3. The method of claim 2, wherein calibrating the detection region comprises:
  determining one or more parameters relating to the one or more identified faces; and
  calibrating the detection region based on the one or more parameters.

4. The method of claim 1, wherein the first stage includes a soft-cascade structure.

5. The method of claim 1, wherein at least one of the first plurality of classifiers is configured to use a modified classification and regression tree method.

6. The method of claim 5, wherein the modified classification and regression tree method is based on a normalized pixel difference.

7. The method of claim 1, wherein the generating a set of modified images comprises:
  smoothing the negative image; and
  modifying the smoothed negative image by at least one of operations including rotating, overturning, translating or zooming the smoothed negative image.

8. The method of claim 7, wherein the smoothing the negative image is performed according to a guide filter algorithm.

9. A method implemented on a computing device having at least one processor, at least one computer-readable storage medium, and a communication port, for face detection, comprising:
  obtaining an image;
  obtaining a plurality of detection scales, wherein different detection scales are used to detect faces of different sizes;
  determining, for each of the plurality of detection scales, a detection region in the image, wherein a larger detection scale corresponds to a detection region that is closer to an image-capture device that captures the image; and
  identifying one or more faces in each detection region by its corresponding detection scale, including:
    determining the one or more faces in the each detection region by a plurality of classifiers at a first stage;
    in response to the determination that the one or more faces are identified in the each detection region at the first stage, determining a positive image; and
    in response to the determination that no face is identified in the each detection region at the first stage:
      determining a negative image, and
      modifying at least one of the plurality of classifiers at the first stage based on the negative image, wherein the modifying at least one of the plurality of classifiers at the first stage comprises:
        obtaining the negative image;
        generating a set of modified images based on the negative image;
        determining weighting factors corresponding to the set of modified images by one or more classifiers;
        determining one or more negative samples based on the weighting factors; and
        modifying the at least one of the first plurality of classifiers based on the one or more negative samples.

10. The method of claim 9, wherein the generating a set of modified images based on the negative image from the first stage comprises:
  smoothing the negative image; and
  modifying the smoothed negative image by at least one of operations including rotating, overturning, translating or zooming the smoothed negative image.

11. The method of claim 10, wherein the smoothing the negative image is performed according to a guide filter algorithm.

12. The method of claim 9, wherein the first stage includes a soft-cascade structure.

13. The method of claim 9, wherein at least one of the plurality of classifiers at the first stage is configured to use a modified classification and regression tree method.

14. The method of claim 13, wherein the modified classification and regression tree method is based on a normalized pixel difference.

15. The method of claim 9, further comprising:
  determining the one or more faces in the each detection region by a plurality of classifiers at a second stage;
  in response to the determination that the one or more faces are identified in the each detection region at the second stage, determining a positive image; and
  in response to the determination that no face is identified in the each detection region at the second stage:
    determining a negative image, and
    modifying at least one of the plurality of classifiers at the second stage based on the negative image.

16. A system comprising:
  a computer-readable storage device storing executable instructions, and
  at least one processor in communication with the computer-readable storage device, wherein when executing the executable instructions, the at least one processor causes the system to:
    obtain an image;
    obtain a plurality of detection scales, wherein different detection scales are used to detect faces of different sizes;
    determine, for each of the plurality of detection scales, a detection region in the image, wherein a larger detection scale corresponds to a detection region that is closer to an image-capture device that captures the image; and identify one or more faces in each detection region by its corresponding detection scale, wherein to identify one or more faces in each detection region, the at least one processor causes the system to:
  determine the one or more faces in the each detection region by a first plurality of classifiers at a first stage;
  determine a negative image in which no face is identified; and
  modify at least one of the first plurality of classifiers based on the negative image, wherein to modify at least one of the first plurality of classifiers, the at least one processor causes the system to:
    obtain the negative image;
    generate a set of modified images based on the negative image;
    determine weighting factors corresponding to the set of modified images according to one or more of the first plurality of classifiers;
    determine one or more negative samples based on the weighting factors; and
    modify the at least one of the first plurality of classifiers based on the one or more negative samples.

* * * * *